Dec. 24, 1940.  G. KAEHLER  2,226,310
IRRIGATION WATER GATE
Filed Dec. 27, 1939
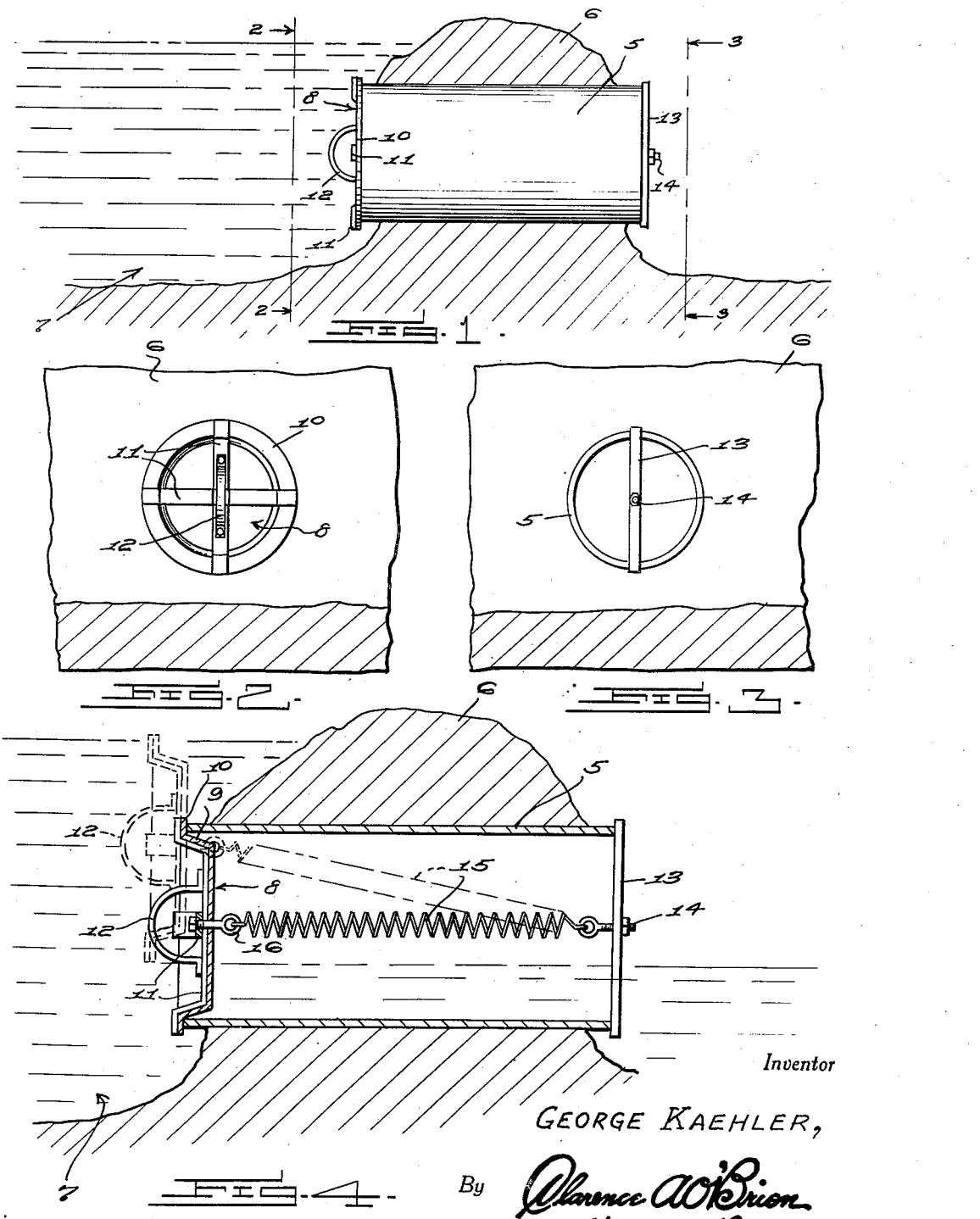
Inventor
GEORGE KAEHLER,
By Clarence A. O'Brien
and Hyman Berman
Attorneys Patented Dec. 24, 1940

2,226,310

UNITED STATES PATENT OFFICE 2,226,310

IRRIGATION WATER GATE

George Kaehler, Fresno, Calif.

Application December 27, 1939, Serial No. 311,179

1 Claim. (Cl. 61—22)

This invention relates to the art of irrigation and more particularly to a gate structure for controlling the flow of water from the main source of water supply to the part of the land or field to be irrigated.

An object of the present invention is to provide a gate of this character characterized by simplicity of construction and simplicity of operation to the end that the flow of water may be regulated readily and at will.

The invention together with its objects and advantages will be best understood from a study of the following description taken in connection with the accompanying drawing wherein:

Figure 1 is an elevational view illustrating the application of the invention.

Figures 2 and 3 are views taken substantially on the lines 2—2 and 3—3, respectively, of Figure 1, and Figure 4 is a longitudinal sectional view further illustrating the application of the invention, the fully closed position of the gate being shown in full lines, and an open position of the gate being shown in broken lines.

Referring more in detail to the drawing it will be seen that in accordance with the present invention there is provided a conduit 5 in the nature of a concrete or metal pipe that extends through the earth embankment 6 from the water-supply ditch 7 to the opposite side of the embankment 6 for the flow of water from the ditch 7 to the land to be irrigated.

The improved water gate, indicated generally by the reference numeral 8, is substantially pan-shaped and has the rim 9 thereof provided with an outstanding flange 10 that, when the gate is in the fully closed position shown in full lines in Figure 4, abuts the peripheral wall of the conduit 5 at the end of said conduit thus insuring against any flow of water from the ditch 7 into the conduit 5.

On the outer side thereof the gate 8 is reinforced by crossed reinforcing bars 11 that extend across the main body portion of the gate, with the ends of said bars reinforcing the rim 9 and flange 10 as shown.

To facilitate handling of the gate 8 the same on the outer side thereof is equipped with a suitable handle 12.

For the gate 8 there is provided an anchoring bar 13 that is disposed against the end of the conduit 5 remote from the gate 8, and which, intermediate its ends, is equipped with an anchor bolt 14 serving to connect therewith one end of a coil spring 15.

The coil spring 15 also has an end thereof secured to the gate 8 through the medium of an anchor bolt 16, and at the point where they cross the reinforcing bars 11 are apertured to accommodate the bolt 16 as also clearly shown in Figure 4.

It will be appreciated that spring 15 normally acts to urge the gate 8 into contact with the conduit 5 and serves to resiliently retain the gate either in the closed position shown in full lines in Figure 4, or at any open position of adjustment, such as shown by broken lines also in Figure 4.

When it is desired, for example, to open the gate, the operator grasping the handle 12 pulls outwardly on the gate with respect to the conduit 5 and against the action of spring 15 and then raises up on the gate to position the same, for example, as indicated by broken line in Figure 2. With the gate in this open position of adjustment water will flow from the ditch 7 through the conduit 5 to empty from the conduit over the portion of the land to be irrigated.

To close the end of the conduit 5 opening into the ditch 7 the operation with respect to the gate 8 is substantially reverse to that above described with regard to the operation for moving the gate to a selected open position.

It will also be appreciated that the entire gate may be bodily readily and easily removed, thus allowing a full head of water to flow through the conduit 5 from the ditch 7 onto the portion of the land to be irrigated; and that the gate can also be readily and easily replaced.

It is thought that a clear understanding of the construction, utility, manner of use, and advantages of a gate of this character will be had without a more detailed description thereof.

Having thus described the invention what is claimed as new is:

In an irrigation gate and in combination with a water conduit of circular shape in cross section, a gate member of circular shape and having an outwardly flaring rim terminating in a flat flange which engages one end of the conduit when the gate member is in closed position, a spring having one end connected with the central part of the gate member, an anchor bar extending across the other end of the conduit and to the center of which the other end of the spring is connected, said spring holding the gate member in closed position and a handle member connected with the gate member for moving the same from a closed position upwardly and outwardly to partly open the gate member, and the spring holding the gate member in this partly open position.

GEORGE KAEHLER.